(12) United States Patent
Rowe et al.

(10) Patent No.: US 8,740,548 B2
(45) Date of Patent: Jun. 3, 2014

(54) GAS TURBINE ENGINE COMPRESSOR VARIABLE STATOR VANE ARRANGEMENT

(75) Inventors: Arthur L. Rowe, Derby (GB); Marc Pons Perez, Derby (GB); Cerith Davies, Uttoxeter (GB)

(73) Assignee: Rolls-Royce PLC, London (GB)

( * ) Notice: Subject to any disclaimer, the term of this patent is extended or adjusted under 35 U.S.C. 154(b) by 1184 days.

(21) Appl. No.: 12/458,539

(22) Filed: Jul. 15, 2009

(65) Prior Publication Data
US 2010/0021285 A1 Jan. 28, 2010

(30) Foreign Application Priority Data

Jul. 23, 2008 (GB) .................................. 0813413.2

(51) Int. Cl.
F01D 17/16 (2006.01)
(52) U.S. Cl.
USPC ................... 415/48; 415/1; 415/17; 415/148; 416/35
(58) Field of Classification Search
USPC ............... 415/1, 17, 30, 33, 47, 48, 118, 148; 416/35, 36, 61
See application file for complete search history.

(56) References Cited

U.S. PATENT DOCUMENTS

| | | | | |
|---|---|---|---|---|
| 3,844,112 A | * | 10/1974 | Harrison | 60/790 |
| 3,867,717 A | * | 2/1975 | Moehring et al. | 340/626 |
| 4,212,161 A | * | 7/1980 | Newirth et al. | 60/39.281 |
| 4,215,412 A | * | 7/1980 | Bernier et al. | 701/100 |
| 4,228,650 A | * | 10/1980 | Camp | 60/39.091 |
| 4,594,849 A | * | 6/1986 | Kenison et al. | 60/795 |
| 4,655,034 A | * | 4/1987 | Kenison et al. | 60/795 |
| 4,809,497 A | * | 3/1989 | Schuh | 60/39.27 |
| 5,042,245 A | * | 8/1991 | Zickwolf, Jr. | 60/773 |
| 5,375,412 A | * | 12/1994 | Khalid et al. | 60/795 |
| 5,379,583 A | | 1/1995 | Zickwolf, Jr. | |
| 5,447,023 A | * | 9/1995 | Meisner et al. | 60/779 |

(Continued)

FOREIGN PATENT DOCUMENTS

| | | |
|---|---|---|
| DE | 36 23 696 A1 | 1/1988 |
| EP | 1 462 634 A2 | 9/2004 |
| WO | WO 03/044353 A1 | 5/2003 |

OTHER PUBLICATIONS

Search Report issued in European Patent Application No. 09 25 1804 dated Dec. 18, 2012.

*Primary Examiner* — Nathaniel Wiehe
*Assistant Examiner* — Aaron Jagoda
(74) *Attorney, Agent, or Firm* — Oliff PLC (57) ABSTRACT

A compressor variable stator vane arrangement comprises at least one stage of variable stator vanes. A speed sensor measures the rotational speed of the compressor rotor. A pressure sensor measures the outlet pressure of the compressor. A second pressure sensor, a temperature sensor and a third pressure sensor measure the total inlet pressure, the temperature and the ambient pressure at the inlet of the gas turbine engine. A processor determines a target operating line as a function of ambient pressure and total inlet pressure. The target operating line is defined to ensure the gas turbine engine operates simultaneously at both the minimum required compressor speed and the minimum required compressor outlet pressure when commanded to idle to minimize idle thrust and fuel burn. The processor determines if the operating point of the compressor, defined in terms of corrected outlet pressure and corrected rotational speed of the compressor rotor is above or below the target operating line of the compressor. The processor adjusts the angle of the variable stator vanes to make the operating point operate on the target operating line.

27 Claims, 6 Drawing Sheets

(56) References Cited

U.S. PATENT DOCUMENTS 7,051,535 B2 * 5/2006 Acker ............................ 60/803
2004/0187473 A1 * 9/2004 Rowe ......................... 60/39.281
2006/0101826 A1 * 5/2006 Martis et al. .................... 60/794
2007/0031238 A1 2/2007 Fujii et al.

* cited by examiner

GAS TURBINE ENGINE COMPRESSOR VARIABLE STATOR VANE ARRANGEMENT

The present invention relates to a compressor variable stator vane arrangement and in particular to a gas turbine engine compressor variable stator vane arrangement.

It is known to provide variable stator vanes in gas turbine engine compressors comprising a high number of stages of rotor blades and stator vanes in order to optimise the operation of the compressor. The variable stator vanes in the gas turbine engine compressor are arranged at different angles throughout the operating range of the compressor in order to achieve the optimum velocity triangles on the rotor blades.

It is known to operate compressor variable stator vanes such that the angles of the variable stator vanes are selected as a function of the speed of the compressor rotor and the outlet pressure of the compressor. In particular the angles of the variable stator vanes are selected as a function of the ambient pressure, engine total inlet pressure, the corrected outlet pressure of the compressor and the corrected speed of the compressor rotor.

The prior art variable stator vane schedule is a compromise between compressor efficiency and available surge margin for the compressor and therefore during steady state operation the compressor does not operate at its maximum efficiency just in case a transient man oeuvre is performed and high levels of surge margin are required by the compressor in order to avoid a surge in the compressor. In particular, when the compressor is operating at idle conditions the variable stator vanes are scheduled predominantly to maximise surge margin and hence the compressor is operating very inefficiently and the compressor is producing very low outlet pressure levels.

Accordingly the present invention seeks to provide a novel compressor variable stator vane arrangement which reduces, preferably overcomes, the above mentioned problem.

Accordingly the present invention provides a gas turbine engine compressor variable stator vane arrangement comprising a compressor casing, at least one stage of variable stator vanes, the variable stator vanes being pivotally mounted in the compressor casing, actuating means arranged to rotate the stator vanes in the at least one stage of variable stator vanes, control means comprising a speed sensor arranged to measure the rotational speed of a compressor rotor, a temperature sensor to measure the inlet temperature of the gas turbine engine, a pressure sensor to measure the outlet pressure of the compressor, a pressure sensor to measure the ambient pressure at the inlet of the gas turbine engine, a pressure sensor to measure the total inlet pressure of the gas turbine engine, means to determine the current operating point of the compressor from the measured rotational speed of the compressor and the measured outlet pressure of the compressor, means to determine the minimum required rotational speed of the compressor rotor and the minimum required outlet pressure of the compressor from the measured ambient pressure and the measured total inlet pressure, means to determine a target operating line of the compressor as a function of the minimum required rotational speed of the compressor rotor and the minimum required outlet pressure of the compressor, a comparator to compare the current operating point of the compressor with the target operating line of the compressor, means to adjust the angle of the variable stator vanes if the comparator determines that the operating point of the compressor is not on the target operating line of the compressor such that the operating point of the compressor is moved nearer towards or onto the target operating line of the compressor.

The target operating line is defined to ensure that the gas turbine engine may operate simultaneously at both the minimum required outlet pressure of the compressor and the minimum required rotational speed for the compressor rotor, hence minimising idle thrust and fuel burn. Both the minimum required outlet pressure of the compressor and the minimum required rotational speed of the compressor are a function of altitude and Mach number, or speed of the aircraft, which are calculated from the ambient pressure and the total inlet pressure of the gas turbine engine.

There may be means to determine the inlet temperature of the compressor. The means to determine the inlet temperature of the compressor may comprise a temperature sensor arranged at the inlet of the compressor.

Preferably the means to determine the inlet temperature of the compressor comprises a temperature sensor arranged to measure the temperature at the inlet of the gas turbine engine, a second speed sensor arranged to measure the rotational speed of a fan rotor and a calculator to determine the temperature at the inlet of the gas turbine engine multiplied by a function of a corrected non-dimensional speed of rotation of the fan rotor.

Preferably the calculator determines the corrected non-dimensional speed of the fan rotor by dividing the rotational speed of the fan rotor by the square root of (the temperature at the inlet of the gas turbine engine divided by sea level ISA temperature).

Preferably the control means comprises a second pressure sensor arranged to measure the pressure at the inlet of the gas turbine engine, the calculator is arranged to determine a corrected outlet pressure of the compressor by dividing the outlet pressure by (the pressure at the inlet of the gas turbine engine divided by sea level ISA pressure).

Preferably the calculator is arranged to determine a corrected non-dimensional speed of the compressor rotor by dividing the speed of the compressor by (the square root of the inlet temperature of the gas turbine engine divided by sea level ISA temperature).

Preferably the comparator is arranged to adjust, e.g. open, the angle of the variable stator vanes in order to increase the corrected outlet pressure of the compressor at a rotational speed of the compressor or the comparator is arranged to adjust, e.g. close, the variable stator vanes in order to decrease the corrected outlet pressure of the compressor at a rotational speed of the compressor.

Preferably the at least one stage of variable stator vanes comprises a plurality of circumferentially arranged and radially extending variable stator vanes.

Preferably the at least one stage of variable stator vanes comprises a plurality of stages of variable stator vanes.

Preferably the compressor is an intermediate pressure compressor, a booster compressor or a high pressure compressor.

The present invention also provides a method of operating a gas turbine engine compressor variable stator vane arrangement, the compressor comprising a compressor casing, at least one stage of variable stator vanes, the variable stator vanes being pivotally mounted in the compressor casing, actuating means arranged to rotate the stator vanes in the at least one stage of variable stator vanes, the method comprising measuring the rotational speed of a compressor rotor, measuring the inlet temperature of the gas turbine engine, measuring the outlet pressure of the compressor, measuring the ambient pressure at the inlet of the gas turbine engine, measuring the total inlet pressure of the gas turbine engine, determining the current operating point of the compressor from the measured rotational speed of the compressor and the measured outlet pressure of the compressor, determining the minimum required rotational speed of the compressor rotor and the minimum required outlet pressure of the compressor from the measured ambient pressure and the measured total inlet pressure, determining a target operating line of the compressor as a function of the minimum required rotational speed of the compressor rotor and the minimum required outlet pressure of the compressor, comparing the current operating point of the compressor with the target operating line of the compressor, adjusting the angle of the variable stator vanes if it is determined that the operating point of the compressor is not on the target operating line of the compressor such that the operating point of the compressor is moved nearer towards or onto the target operating line of the compressor.

The method may comprise determining the inlet temperature of the compressor. The inlet temperature of the compressor may be determined by measuring the inlet temperature of the compressor.

Preferably the method comprises determining the inlet temperature of the compressor by measuring the temperature at the inlet of the gas turbine engine, measuring the rotational speed of a fan rotor and determining the temperature at the inlet of the gas turbine engine multiplied by a function of a corrected non-dimensional speed of rotation of the fan rotor.

Preferably the method comprises determining the corrected non-dimensional speed of the fan rotor by dividing the rotational speed of the fan rotor by the square root of (the temperature at the inlet of the gas turbine engine divided by sea level ISA temperature).

Preferably the method comprises measuring the pressure at the inlet of the gas turbine engine, determining a corrected outlet pressure of the compressor by dividing the outlet pressure by (the pressure at the inlet of the gas turbine engine divided by sea level ISA pressure).

Preferably the method comprises determining a corrected non-dimensional speed of the compressor rotor by dividing the speed of the compressor by (the square root of the inlet temperature of the gas turbine engine divided by sea level ISA temperature).

Preferably the method comprises selecting the angle of the variable stator vanes of the at least one stage of variable stator vanes as a function of the speed of the compressor rotor divided by (the square root of the inlet temperature of the gas turbine engine divided by sea level ISA temperature).

Preferably the method comprises adjusting, e.g. opening, the angle of the variable stator vanes in order to increase the corrected outlet pressure of the compressor at a rotational speed of the compressor or adjusting, e.g. closing, the variable stator vanes in order to decrease the corrected outlet pressure of the compressor at a rotational speed of the compressor.

Preferably the at least one stage of variable stator vanes comprises a plurality of circumferentially arranged and radially extending variable stator vanes.

Preferably the at least one stage of variable stator vanes comprises a plurality of stages of variable stator vanes.

Preferably the compressor is an intermediate pressure compressor, a booster compressor or a high pressure compressor.

The present invention will be more fully described by way of example with reference to the accompanying drawings in which.

Figure 1:
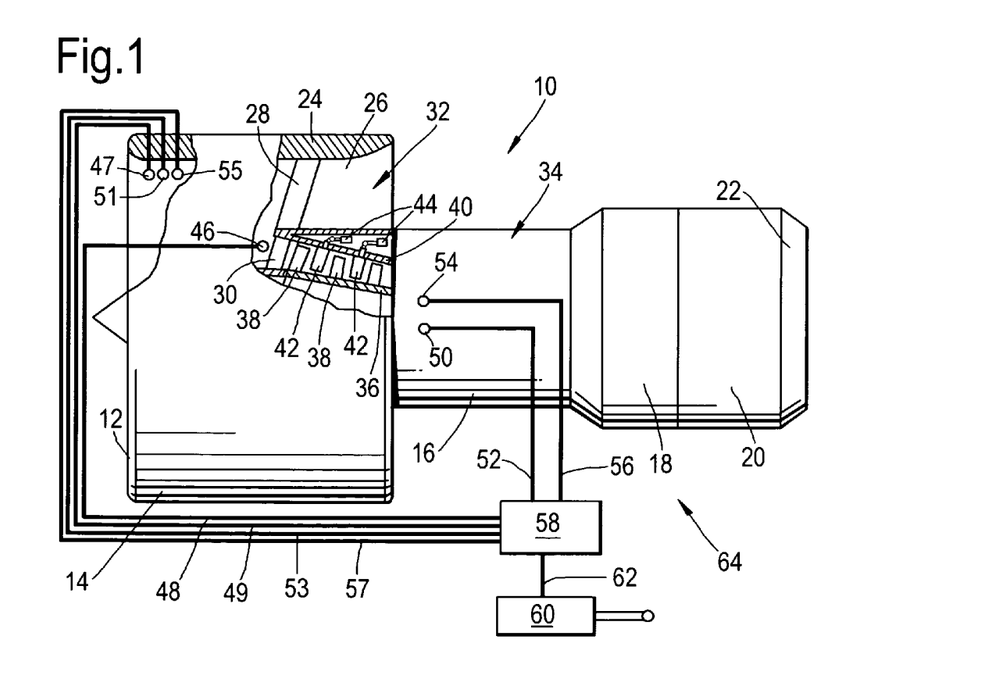
FIG. 1 is a partially cut away view of a turbofan gas turbine engine having a compressor variable stator vane arrangement according to the present invention.

A turbofan gas turbine engine 10, as shown in FIG. 1, comprises in axial flow series an inlet 12, a fan section 14, a compressor section 16, a combustion section 18, a turbine section 20 and an exhaust 22. The fan section 14 comprises a fan casing 24, which partially defines a fan duct 26 and a plurality of circumferentially spaced radially extending fan outlet guide vanes 28 extend from the fan casing 24 to a compressor casing 40. The compressor section 16 comprises in axial flow series an intermediate pressure compressor 32 and a high pressure compressor 34. A stage of stator vanes 30 is provided upstream of the intermediate pressure compressor 32 to guide the air flow from the fan section 14 to the intermediate pressure compressor 32 and high pressure compressor 34. A fan (not shown) in the fan section is driven by a low pressure turbine (not shown), the intermediate pressure compressor 32 is driven by an intermediate pressure turbine (not shown) and the high pressure compressor 34 is driven by a high pressure turbine (not shown).

Figure 2:
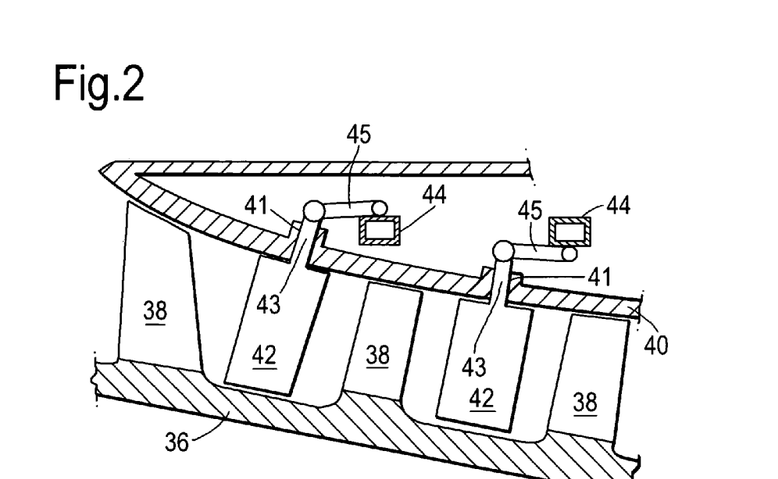
FIG. 2 shows an enlarged cross-sectional view of a compressor variable stator vane arrangement according to the present invention.

The intermediate pressure compressor 32, as shown more clearly in FIG. 2, comprises a compressor rotor 36, which carries a plurality of axially spaced stages of rotor blades 38. The rotor blades 38 in each stage are circumferentially spaced and extend radially outwardly from the compressor rotor 36. The intermediate pressure compressor 32 also comprises a stator casing 40 which carries one or more stages of variable stator vanes 42, in this example there are a plurality of stages of variable stator vanes 42. The variable stator vanes 42 in each stage are circumferentially spaced and extend radially inwardly from the compressor casing 40. Each variable stator vane 42 comprises a spindle 43 which locates in and extends through a respective aperture 41 in the compressor casing 40 to pivotally mount the variable stator vane 42 in the compressor casing 40. The spindle 41 of each variable stator vane 42 is connected to a control ring 44 by a respective one of a plurality of operating levers 45. Each control ring 44 is operated to cause rotation of the control ring 44 about the axis of the intermediate pressure compressor 32 and the turbofan gas turbine engine 10 so as to adjust the angle of the variable stator vanes 42. In one arrangement all the control rings 44 are mechanically connected and a single ram operates all the control rings 44. In an alternative arrangement each control ring 44 is operated by its own independent ram. Each ram may be a hydraulic ram, a pneumatic ram, an electric ram or any other suitable ram.

A control arrangement 64 according to the present invention, as shown in FIGS. 1 and 2, is provided to control the operation of the stages of variable stator vanes 42. The control arrangement 64 comprises a first temperature sensor 46 to measure the temperature T24 at the inlet to the intermediate pressure compressor 32, a speed sensor 50 to measure the speed of rotation N2 of the compressor rotor 36 of the intermediate pressure compressor 32 and a first pressure sensor 54 to measure the pressure PS26 at the outlet of the intermediate pressure compressor 32. The first temperature sensor 46, the speed sensor 50 and the first pressure sensor 54 are arranged to send the measurements of temperature T24, speed N2 and pressure PS26 to a processor, or control unit, 58 via electrical cables 48, 52 and 56 respectively. The control arrangement 64 also comprises a second pressure sensor 47 to measure the total engine inlet pressure P20 at the inlet 12 of the turbofan gas turbine engine 10, a second temperature sensor 51 to measure the temperature T20 at the inlet of the turbofan gas turbine engine 10 and a third pressure sensor 55 to measure the ambient pressure Pamb at the inlet 12 of the turbofan gas turbine engine 10. The second pressure sensor 47, the second temperature sensor 51 and the third pressure sensor 55 are arranged to send the measurements of total engine inlet pressure P20, temperature T20 and ambient pressure Pamb to the processor, or control unit, 58 via electrical cable 49, 53 and 57. The processor, or control unit, 58 is arranged to send control signals to the hydraulic rams, pneumatic rams or electric rams, 60 via line 62 so as to adjust the position of the variable stator vanes 42.

The turbofan gas turbine engine 10 operates quite conventionally and its operation will not be fully mentioned.

Figure 3:
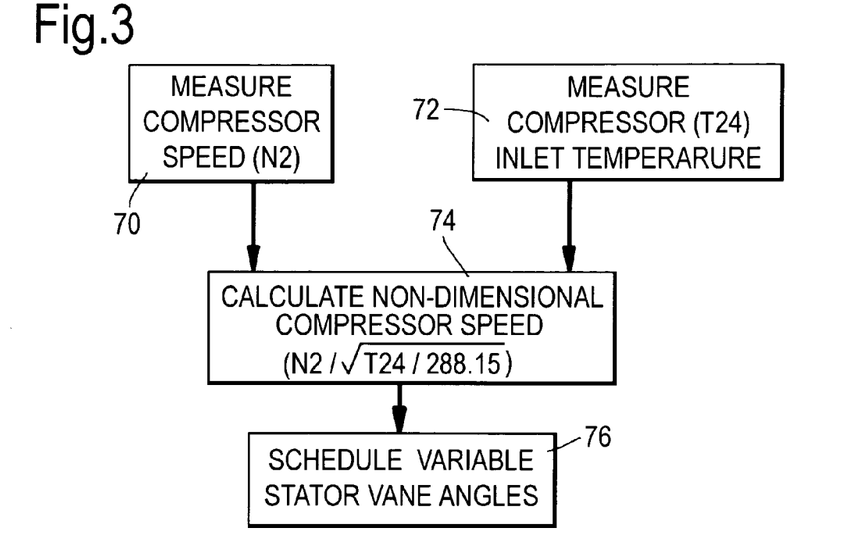
FIG. 3 is a flow chart of a control for a compressor variable stator vane arrangement according to the prior art.

FIG. 3 shows a flow chart of the control arrangement for a compressor variable stator vane arrangement according to the prior art. In the prior art arrangement the speed N2 of the compressor rotor of the intermediate pressure compressor is measured at 70 and the inlet temperature T24 of the intermediate pressure compressor is measured at 72. The corrected non-dimensional speed of the compressor rotor of the intermediate pressure compressor is calculated by dividing the speed N2 of the compressor rotor of the intermediate pressure compressor by the square root of the inlet temperature T24 of the intermediate pressure compressor divided by sea level ISA temperature, e.g. N2RTHT24 or N2/sqrt(T24/288.15)) at 74. The angles of the variable stator vanes are selected as a function of the speed N2 of the compressor rotor of the intermediate pressure compressor divided by the square root of the inlet temperature T24 of the intermediate pressure compressor divided by sea level ISA temperature. The optimum variable stator vane schedule is selected as a compromise between compressor efficiency and surge margin for the intermediate pressure compressor. A look up table is used to select a certain variable stator vane angle as a function of the speed N2 of the compressor rotor of the intermediate pressure compressor divided by the square root of the inlet temperature T24 of the intermediate pressure compressor divided by sea level ISA temperature, e.g. N2RTH24 or (N2/sqrt(T24/288.15)) at 76. In the prior art arrangement it may also be possible to calculate T24 and not measure T24 directly.

Figure 4:
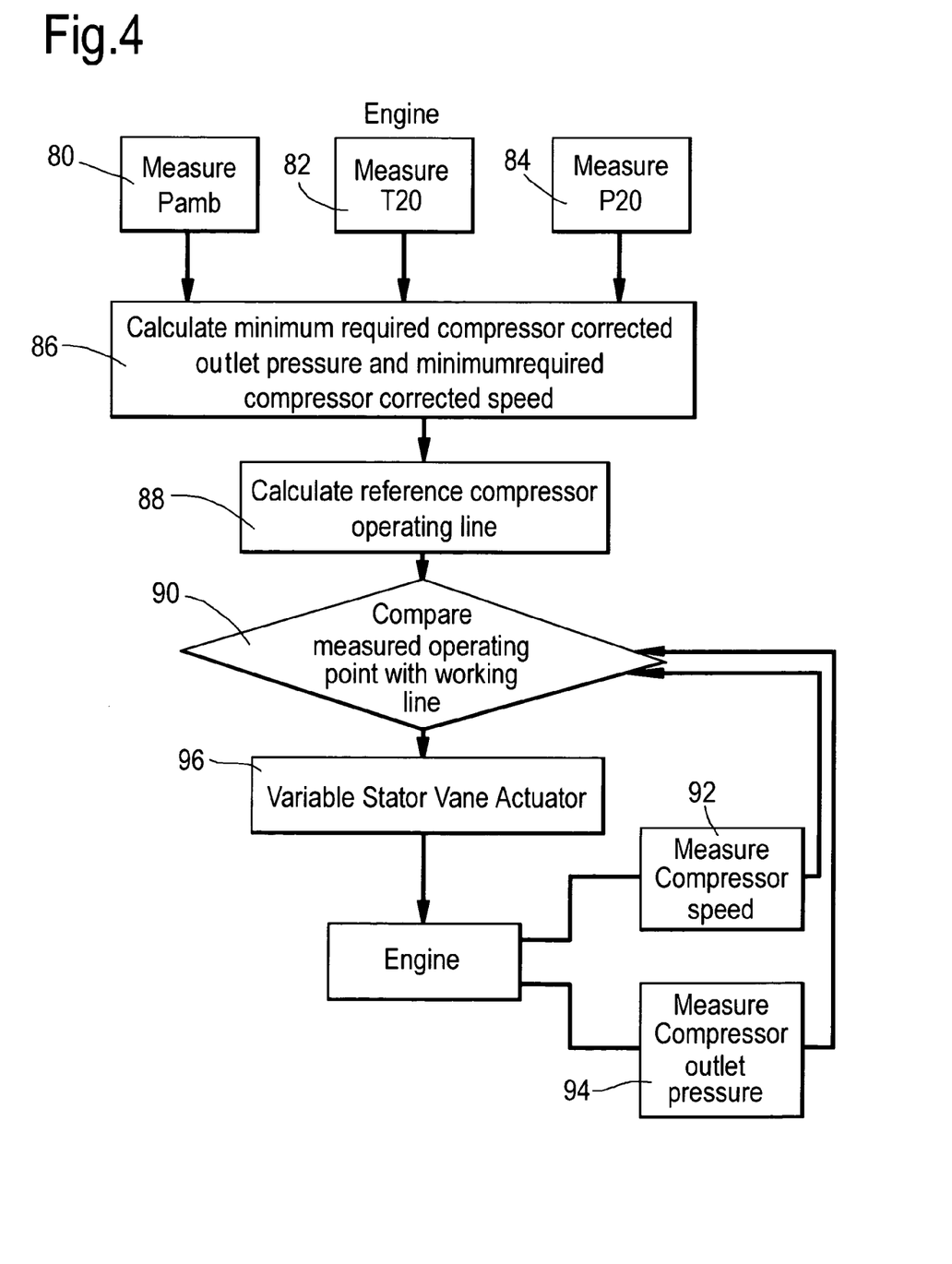
FIG. 4 is a flow chart of a control for a compressor variable stator vane arrangement according to the present invention.

FIG. 4 shows a flow chart of a control arrangement 64 for a compressor variable stator vane arrangement according to the present invention. In the present invention the ambient pressure Pamb is measured by the third pressure sensor 55 at 80, the total engine inlet pressure P20 is measured by the second pressure sensor 47 at 84 and the inlet temperature T20 is measured by the second temperature sensor 51 at 82. The minimum required corrected speed and minimum required corrected outlet pressure for the intermediate pressure compressor 32 are calculated at 86. The target operating line for the intermediate pressure compressor 32 is calculated at 88 as a function of the minimum required corrected speed of the intermediate pressure compressor 32 and the minimum required corrected outlet pressure of the intermediate pressure compressor 32, which are calculated based on the ambient pressure Pamb and the total engine inlet pressure P20. The speed N2 of the compressor rotor 36 of the intermediate pressure compressor 32 is measured by the speed sensor 50 at 92. The corrected non-dimensional speed of the compressor rotor 36 of the intermediate pressure compressor 32 is calculated by dividing the speed N2 of the compressor rotor 36 of the intermediate pressure compressor 32 by the square root of the inlet temperature T20 of the turbofan gas turbine engine 10 divided by sea level ISA temperature, e.g. N2RTHT20 or N2/sqrt(T20/288.15)) at 90. The outlet pressure PS26 of the intermediate pressure compressor 32 is measured by the pressure sensor 54 at 94. The outlet pressure PS26 of the intermediate pressure compressor 32 is corrected by dividing by DP20, where DP20=P20/sea level pressure at 90. The corrected speed of the intermediate pressure compressor 32 and the corrected outlet pressure of the intermediate pressure compressor 32 are used to determine the current operating point of the intermediate pressure compressor 32 at 90. The current operating point of the intermediate pressure compressor 32 is then compared with the target operating line of the intermediate pressure compressor 32 at 90. If it is determined at 90 that the current operating point of the intermediate pressure compressor 32 is not on the target operating line of the intermediate pressure compressor 32 the angles of the variable stator vanes 40 are adjusted at 96 such that the current operating point of the intermediate pressure compressor 32 is moved onto, or nearer to, the target operating line for the intermediate pressure compressor 32. The processor/control unit 58 performs steps 86, 88 and 90.

The intermediate pressure compressor 32 is operated along the target compressor working line calculated at 88 to allow the turbofan gas turbine engine 10 to operate simultaneously on the minimum required speed N2 of the intermediate pressure compressor 32 and the minimum required outlet pressure PS26 of the intermediate pressure compressor 32 when commanded at idle operating conditions and hence minimises fuel flow and thrust at idle operating conditions of the turbofan gas turbine engine 10.

The present invention is particularly concerned with the operation of the turbofan gas turbine engine 10 at idle operating conditions and seeks to optimise the angular position of the variable stator vanes 40 using a closed loop control system in order to minimise fuel burn and minimise thrust. The main limits to be observed at idle operating conditions are a minimum speed N2 of rotation of the compressor rotor 35 of the intermediate pressure compressor 32, which is required to maintain a minimum generator speed, and a minimum outlet pressure PS26, which is required to maintain adequate air system pressure ratios.

The compressor efficiency penalty at idle conditions resulting from the prior art control system results in a high level of fuel flow in order to maintain a minimum outlet pressure for the intermediate pressure compressor. This problem is exacerbated if the compressor rotor/compressor shaft of the intermediate pressure compressor is also used to provide power to an electrical generator or electrical generators. A high level of electrical load, produced by the electrical generator, further reduces the outlet pressure of the intermediate pressure compressor and hence results in even higher levels of fuel flow in order to maintain the minimum outlet pressure for the intermediate pressure compressor. On the contrary, a low level of electrical load results in a higher outlet pressure of the intermediate pressure compressor than required.

The most desirable operating point at idle conditions is one where the intermediate pressure compressor of the turbofan gas turbine engine is simultaneously operating at the minimum outlet pressure for the intermediate pressure compressor and at the minimum speed of the compressor rotor of the intermediate pressure compressor. The present invention seeks to operate the variable stator vanes of the intermediate pressure compressor such that the intermediate pressure compressor operates along an operating line where at idle conditions it is simultaneously operating at the minimum outlet pressure for the intermediate pressure compressor and at the minimum speed of the compressor rotor of the intermediate pressure compressor.

Thus the present invention provides a closed loop control for the variable stator vanes 40 for the intermediate pressure compressor 32. If the operating point of the intermediate pressure compressor 32, defined by the measured corrected non-dimensional speed N2RTHT20, or (N2/sqrt(T20/288.15)) of the compressor rotor 36 and the measured corrected outlet pressure PS26/DP20 of the intermediate pressure compressor 32 is below the target operating line for the intermediate pressure compressor 32, the variable stator vanes 40 are opened more, the angle decreased, in order to make the intermediate pressure compressor 32 operate more efficiently and achieve a higher outlet pressure PS26. On the other hand if the operating point of the intermediate pressure compressor 32, defined by the measured corrected non-dimensional speed N2RTHT20, or (N2/sqrt(T20/288.15)) of the compressor rotor 36 and the measured corrected outlet pressure PS26/DP20 of the intermediate pressure compressor 32 is above the target operating line for the intermediate pressure compressor 32, the variable stator vanes 40 are closed, the angle increased, in order to make the intermediate pressure compressor 32 operate less efficiently and reduce thrust.

In order to determine whether the operating point of the intermediate pressure compressor is "too high" or "too low" an ideal relationship between the corrected outlet pressure PS26/DP20 and the corrected non-dimensional speed N2RTHT20, or (N2/sqrt(T20/288.15)), of the compressor rotor 36 is used to allow the intermediate pressure compressor 32 to reach its minimum idle operating point. The ideal relationship between PS26 and N2 is expressed in terms of corrected non-dimensional parameters in order to cover all of the operating conditions, e.g. throughout the flight envelope. The relationship is expressed as PS26/DP20 (PS26/P20/14.696) and N2RTHT20 (N2/sqrt(T20/288.15)).

Figure 5:
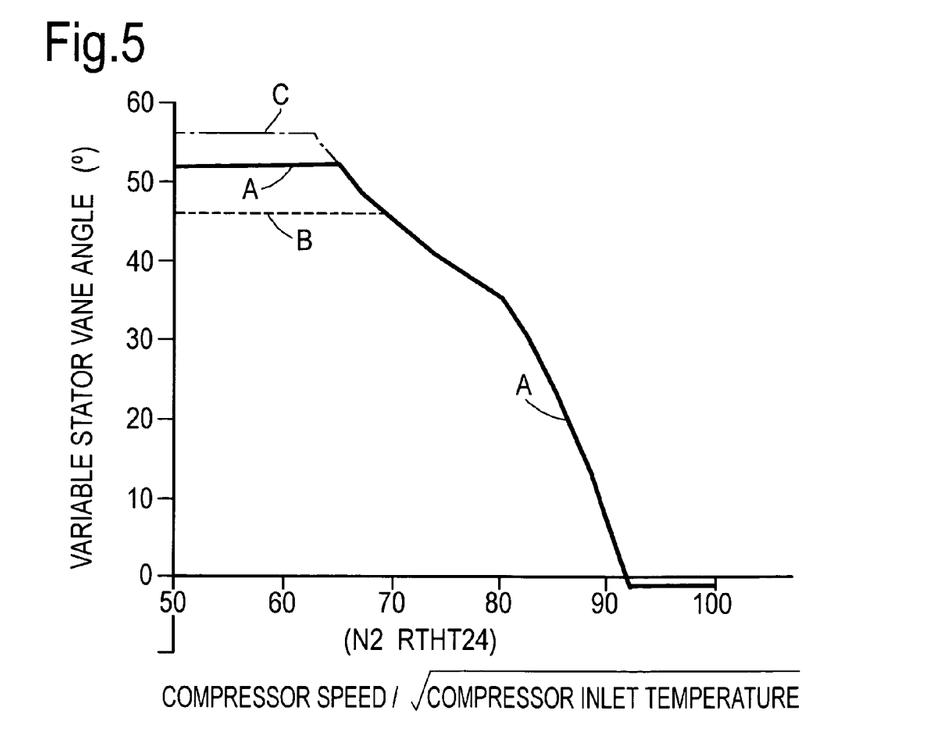
FIG. 5 is graph of variable stator vane angle against compressor rotor speed divided by square root of compressor inlet temperature.

FIG. 5 is graph of variable stator vane angle against compressor rotor speed divided by square root of compressor inlet temperature divided by sea level temperature. FIG. 5 shows the variable stator vane operating schedule A for the prior art arrangement. FIG. 5 shows the variable stator vane operating schedule B at idle conditions for the present invention when the corrected outlet pressure PS26/DP20 of the intermediate pressure compressor is too low and it is clearly seen that the angle of the variable stator vanes is decreased relative to schedule A for the prior art. FIG. 5 shows the variable stator vane operating schedule C at idle conditions for the present invention when the corrected outlet pressure PS26/DP20 of the intermediate pressure compressor is too high and it is clearly seen that the angle of the variable stator vanes is increased relative to schedule A for the prior art.

Figure 6:
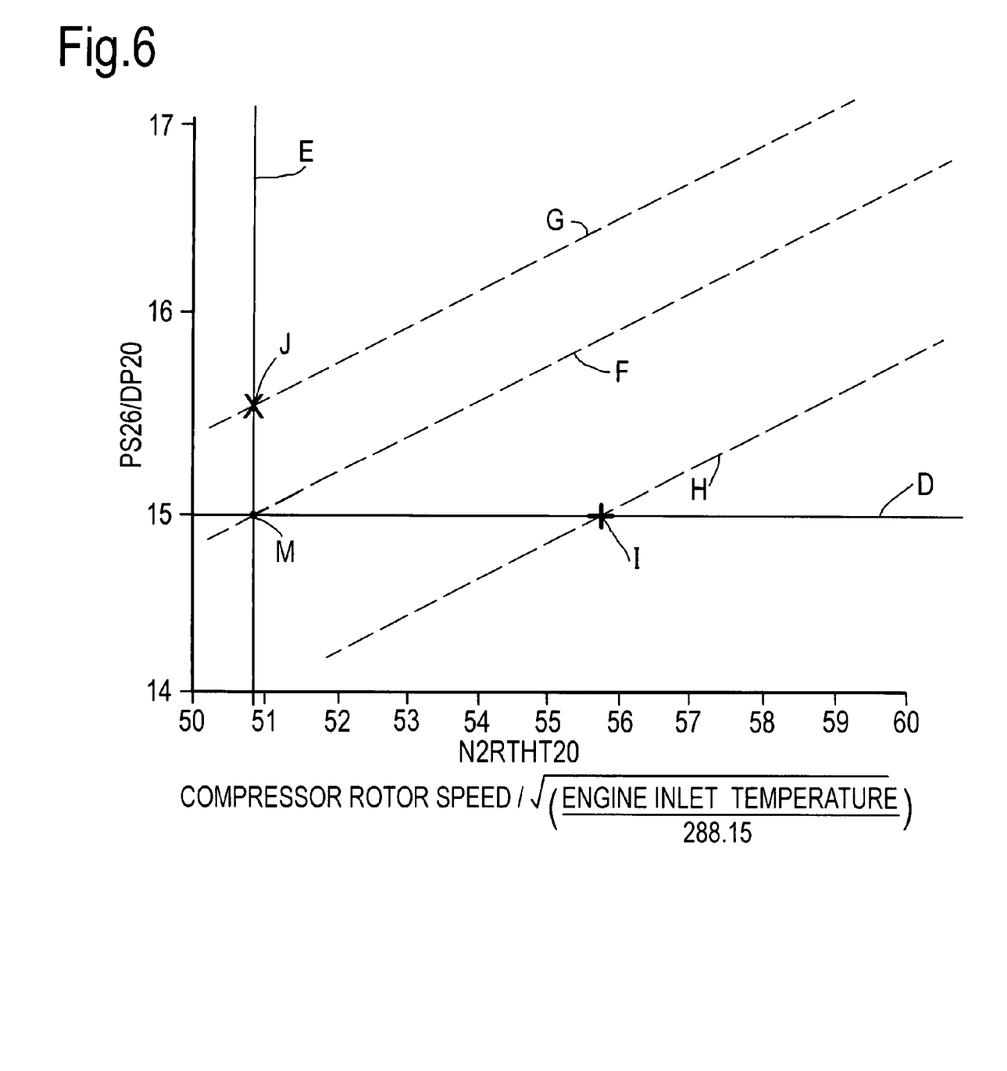
FIG. 6 is a graph of corrected compressor outlet pressure against corrected compressor rotor speed showing a target compressor operating line in comparison with other compressor operating lines.

FIG. 6 is a graph of compressor outlet pressure PS26 divided by DP20 (=P20/14.696) against corrected non-dimensional compressor rotor speed N2RTHT20. On FIG. 6 line D is the minimum corrected outlet pressure for the compressor and line E is the minimum corrected speed for the compressor. In addition line F is the desired operating line, or target operating line, according to the present invention which enables both a minimum speed of the compressor and a minimum outlet pressure of the compressor. Lines D, E and F are a function of the flight conditions, e.g. ambient pressure Pamb, total inlet pressure P20 and inlet temperature T20, of the turbofan gas turbine engine. Line H is an example operating line where large levels of power are extracted from the turbofan gas turbine engine and line G is an example operating line where low levels of power are extracted from the turbofan gas turbine engine. At point I according to the prior art for high levels of power offtake the engine and compressor is limited by the minimum outlet pressure of the compressor and causes a substantial increase in idle speed and hence fuel consumption. At point J according to the prior art for low levels of power offtake the outlet pressure of the compressor is higher than necessary and also the thrust and fuel consumption of the engine. Points I and J are the minimum idle points according to the prior art. It is to be noted that the target operating line passes though a point M which is where line D, the line of minimum corrected outlet pressure for the compressor, and line E, the line of minimum corrected speed for the compressor, intersect.

The advantages of the present invention is that an optimum variable stator vane setting is provided at idle operating conditions at both the minimum outlet pressure and the minimum speed of the compressor and this results in significant benefits in terms of idle thrust and idle fuel consumption. By opening the variable stator vanes it is possible to move from operating line H towards operating line F. Similarly, by closing the variable stator vanes it is possible to move from operating line G towards operating line F. The variable stator vane settings at idle conditions are constantly optimised for each specific engine, therefore mitigating the effects of engine to engine variation and mitigating the effects of degradation/deterioration of a particular engine. The variable stator vanes allow acceptable levels of outlet pressure to be achieved by improving the efficiency of the compressor rather than by increasing the fuel flow to the engine.

Figure 8:
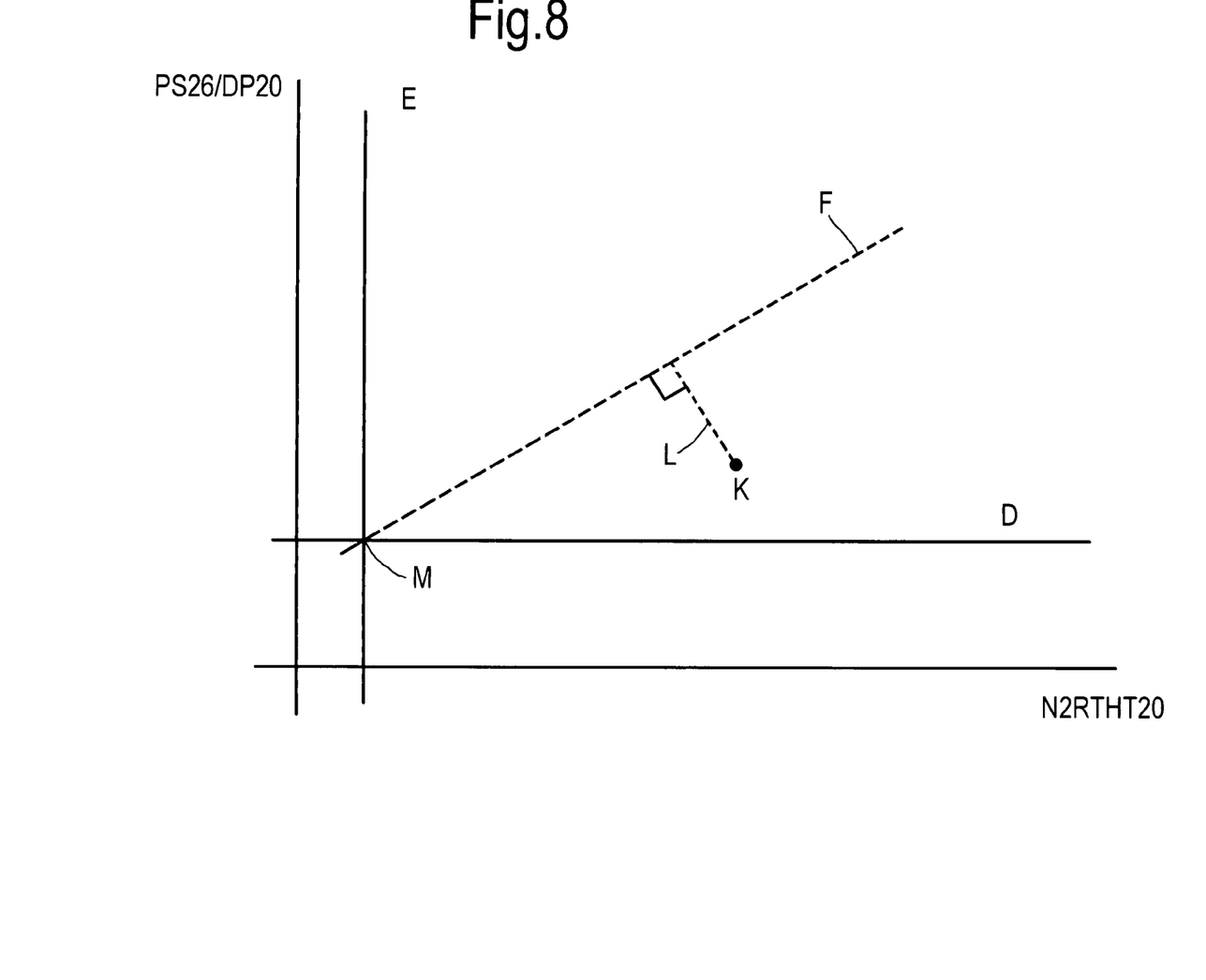
FIG. 8 is a graph of corrected compressor outlet pressure against corrected compressor rotor speed showing the distance between a target compressor operating line and an operating point.

FIG. 8 is a graph of compressor outlet pressure PS26 divided by DP20 (=P20/14.696) against corrected non-dimensional compressor rotor speed N2RTHT20. As in FIG. 6, line D is the minimum corrected outlet pressure for the compressor and line E is the minimum corrected speed for the compressor. In addition line F is the desired operating line, or target operating line, according to the present invention which enables both a minimum speed of the compressor and a minimum outlet pressure of the compressor. In addition, point K is an operating point of the compressor chosen as an example. When the operating point K is compared to the target operating line F the minimum distance between operating point K and target operating line F is calculated as illustrated by line L. The angle of the variable stator vanes is then adjusted to minimise this distance L.

Figure 7:
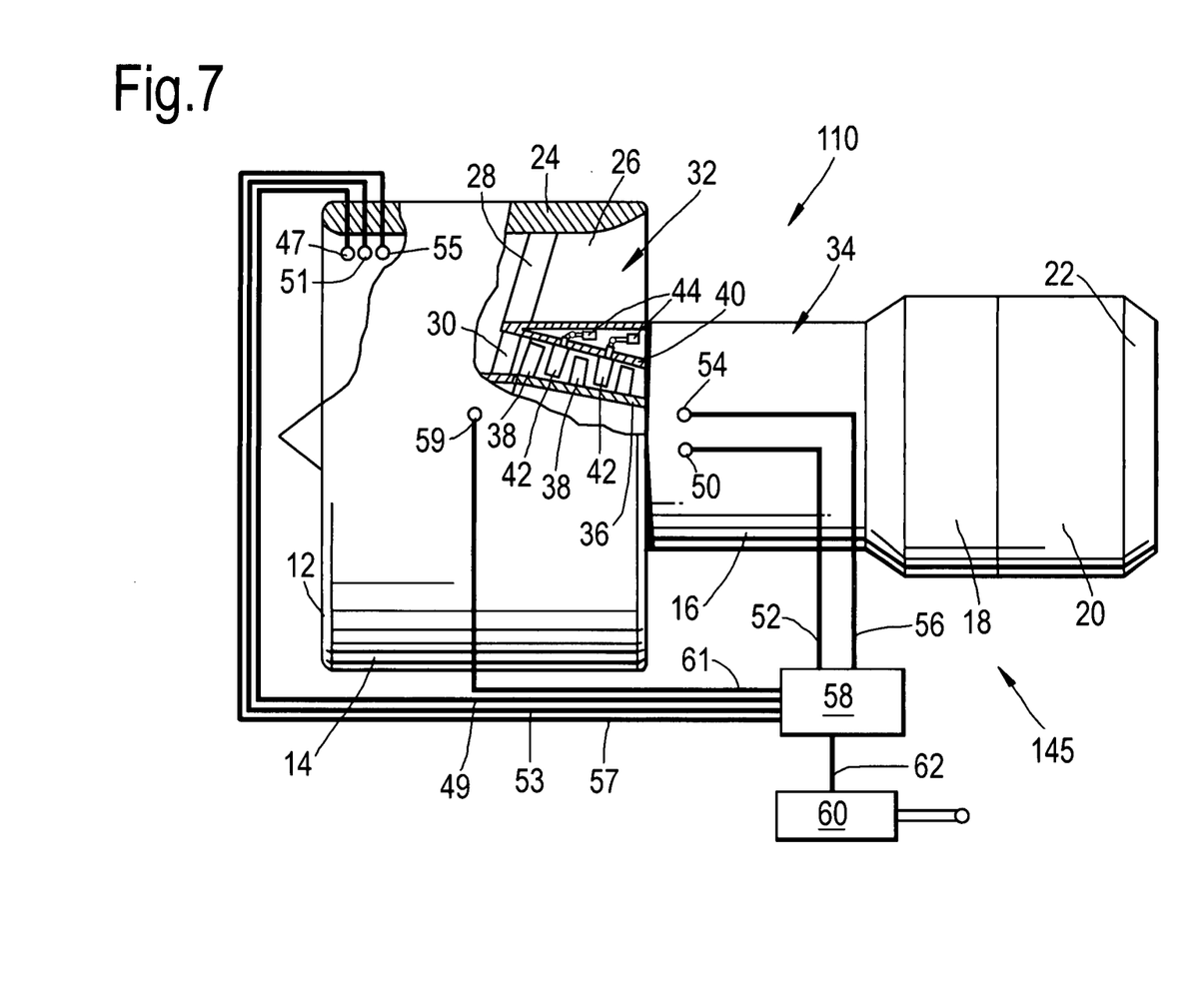
FIG. 7 is a partially cut away view of a turbofan gas turbine engine having an alternative compressor variable stator vane arrangement according to the present invention.

A further control arrangement 145 according to the present invention, as shown in FIG. 7, is provided to control the operation of the stages of variable stator vanes 42. The control arrangement 145 is substantially the same as that in FIG. 1, but does not directly measure the inlet temperature of the intermediate pressure compressor 32. The control arrangement 145 comprises a first speed sensor 50 to measure the speed of rotation N2 of the compressor rotor 36 of the intermediate pressure compressor 32 and a first pressure sensor 54 to measure the pressure PS26 at the outlet of the intermediate pressure compressor 32. The first speed sensor 50 and the first pressure sensor 54 are arranged to send the measurements of speed N2 and pressure PS26 to a processor, or control unit, 58 via electrical cables 52 and 56 respectively. The control arrangement 145 also comprises a second pressure sensor 47 to measure the total inlet pressure P20 at the inlet 12 of the turbofan gas turbine engine 10, a temperature sensor 51 to measure the temperature T20 at the inlet of the turbofan gas turbine engine 10, a second speed sensor 59 to measure the speed of rotation N1 of the fan rotor of the fan section 14 and a third pressure sensor 55 to measure the ambient pressure Pamb at the inlet of the turbofan gas turbine engine 10. The second pressure sensor 47, the temperature sensor 51, the second speed sensor 59 and the third pressure sensor 55 are arranged to send the measurements of pressure P20, temperature T20, speed N1 and ambient pressure Pamb to the processor, or control unit, 58 via electrical cables 49, 53, 61 and 57 respectively. The processor, or control unit, 58 is arranged to send control signals to the hydraulic rams, pneumatic rams or electric rams, 60 via line 62 so as to adjust the position of the variable stator vanes 42.

In the further control arrangement 145 the processor, or control unit, 58 determines the inlet temperature T24 of the intermediate pressure compressor 32 from the inlet temperature T20 of the turbofan gas turbine engine 10 measured by the temperature sensor 51. The inlet temperature T24 of the intermediate pressure compressor 32 is determined, or calculated, using T24=T20×T24/T20=T20×f(N1RTHT20), where T20 is the inlet temperature of the turbofan gas turbine engine 10, T24 is the inlet temperature of the intermediate pressure compressor 32, N1RTHT20 is the corrected non-dimensional speed of the fan rotor (N1/sqrt(T20/288.15). Basically T24/T20 is calculated using a look up table where N1RTHT20 is the input.

Although the present invention has been described with reference to a turbofan gas turbine engine comprising a fan section, an intermediate pressure compressor and a high pressure compressor driven by separate low pressure turbine, intermediate pressure turbine and high pressure turbine respectively it is equally applicable to a turbofan gas turbine engine comprising a fan section, a booster compressor and a high pressure compressor where the fan section and booster compressor are driven by a low pressure turbine and the high pressure compressor is driven by a high pressure turbine.

The main point of the present invention is to measure the flight conditions of the gas turbine engine, by measuring the total inlet pressure P20, the inlet temperature T20 and the ambient pressure Pamb. The target operating line of the compressor is a function of these conditions and not of the gas turbine engine. The objective is to allow the compressor of the gas turbine engine and hence the gas turbine engine to operate at the minimum idle point, e.g. at the point of intersection between the minimum rotational speed of the compressor rotor and the minimum outlet pressure of the compressor.

Although the present invention has been described with reference to an intermediate pressure compressor it is equally applicable to a booster compressor or a high pressure compressor.

Although the present invention has been described with reference to a turbofan gas turbine engine it is equally applicable to a turbojet gas turbine engine or a turboprop gas turbine engine.

Although the present invention has been described with reference to idle operating conditions it may be possible to use it at all operating conditions/all power levels to maintain optimum efficiency of the compressor.

The invention claimed is:

1. A gas turbine engine compressor variable stator vane arrangement comprising:
   a gas turbine engine including:
      a gas turbine engine compressor;
      a compressor rotor,
      a compressor casing, and
      at least one stage of variable stator vanes, the at least one stage of variable stator vanes being pivotally mounted in the compressor casing,
   an actuating arrangement arranged to rotate stator vanes of the at least one stage of variable stator vanes,
   a control arrangement comprising a first speed sensor arranged to measure a rotational speed of the compressor rotor, a temperature sensor to measure an inlet temperature of the gas turbine engine, a first pressure sensor to measure an outlet pressure of the gas turbine engine compressor, a second pressure sensor to measure an ambient pressure at an inlet of the gas turbine engine, a third pressure sensor to measure a total inlet pressure of the gas turbine engine,
   a processor configured to determine a current operating point of the gas turbine engine compressor from a measured rotational speed of the compressor rotor and a measured outlet pressure of the gas turbine engine compressor, and
   a comparator to compare the current operating point of the gas turbine engine compressor with a target operating line of the gas turbine engine compressor, and
   the processor further configured to adjust an angle of the at least one stage of variable stator vanes if the comparator determines that the current operating point of the gas turbine engine compressor is not on the target operating line of the gas turbine engine compressor, such that the current operating point of the gas turbine engine compressor is moved nearer towards or onto the target operating line of the gas turbine engine compressor,
   wherein, at idle conditions, the gas turbine engine compressor is simultaneously operating at the minimum required outlet pressure of the gas turbine engine compressor and at the minimum required rotational speed of the compressor rotor,
   wherein the target operating line corresponds to a ratio between the rotational speed and the outlet pressure of the gas turbine engine compressor, the target operating line including a point comprising the minimum required rotational speed and a minimum required outlet pressure.

2. A compressor variable stator vane arrangement as claimed in claim 1 further comprising a second temperature sensor arranged at the inlet of the gas turbine engine compressor.

3. A compressor variable stator vane arrangement as claimed in claim 1 wherein a second speed sensor is arranged to measure the rotational speed of a fan rotor and the processor is configured to determine the inlet temperature of the gas turbine engine compressor, the processor comprises a calculator to determine the inlet temperature of the gas turbine engine compressor by multiplying the inlet temperature of the gas turbine engine by a function of a corrected non-dimensional speed of rotation of the fan rotor.

4. A compressor variable stator vane arrangement as claimed in claim 3 wherein the calculator determines the corrected non-dimensional speed of the fan rotor by dividing the rotational speed of the fan rotor by the square root of (the temperature at the inlet of the gas turbine engine divided by sea level ISA temperature).

5. A compressor variable stator vane arrangement as claimed in claim 1 wherein the calculator is arranged to determine a corrected outlet pressure of the gas turbine engine compressor by dividing the outlet pressure by (the pressure at the inlet of the gas turbine engine divided by sea level ISA pressure).

6. A compressor variable stator vane arrangement as claimed in claim 5 wherein the calculator is arranged to determine a corrected non-dimensional speed of the compressor rotor by dividing the speed of the compressor rotor by (the square root of the inlet temperature of the gas turbine engine divided by sea level ISA temperature).

7. A compressor variable stator vane arrangement as claimed in claim 1 wherein the comparator is arranged to adjust the angle of the at least one stage of variable stator vanes in order to increase a corrected outlet pressure of the gas turbine engine compressor at a rotational speed of the compressor rotor or the comparator is arranged to adjust the at least one stage of variable stator vanes in order to decrease the corrected outlet pressure of the gas turbine engine compressor at a rotational speed of the compressor rotor.

8. A compressor variable stator vane arrangement as claimed in claim 1 wherein the at least one stage of variable stator vanes comprises a plurality of circumferentially arranged and radially extending variable stator vanes.

9. A compressor variable stator vane arrangement as claimed in claim 1 wherein the at least one stage of variable stator vanes comprises a plurality of stages of variable stator vanes.

10. A compressor variable stator vane arrangement as claimed in claim 1 wherein the gas turbine engine compressor is selected from a group comprising an intermediate pressure compressor, a booster compressor and a high pressure compressor.

11. A compressor variable stator vane arrangement as claimed in claim 1 wherein the processor is further configured to determine the target operating line and arrange the target operating line to pass through a point where a line of minimum required outlet pressure of the gas turbine engine compressor and a line of minimum required rotational speed of the compressor rotor intersect.

12. A compressor variable stator vane arrangement as claimed in claim 1 wherein
the compressor rotor is arranged to drive an electrical generator, and
the compressor is arranged to pressurise an air system,
wherein the minimum required rotational speed of the compressor rotor is a minimum electrical generator speed, and the minimum outlet pressure is an outlet pressure required to maintain adequate air system pressure ratios.

13. A method of operating a gas turbine engine compressor variable stator vane arrangement, the gas turbine engine compressor variable stator vane arrangement comprising a gas turbine engine including 1) a gas turbine engine compressor, 2) a compressor rotor, 3) a compressor casing, and 4) at least one stage of variable stator vanes, the at least one stage of variable stator vanes being pivotally mounted in the compressor casing, and an actuating arrangement arranged to rotate stator vanes of the at least one stage of variable stator vanes, the method comprising:
measuring a rotational speed of the compressor rotor,
measuring an inlet temperature of the gas turbine engine,
measuring an outlet pressure of the gas turbine engine compressor,
measuring an ambient pressure at an inlet of the gas turbine engine,
measuring a total inlet pressure of the gas turbine engine,
determining a current operating point of the gas turbine engine compressor from the rotational speed of the gas turbine engine compressor and the outlet pressure of the gas turbine engine compressor,
comparing the current operating point of the gas turbine engine compressor with a target operating line of the gas turbine engine compressor, and
adjusting an angle of the at least one stage of variable stator vanes if it is determined that the current operating point of the gas turbine engine compressor is not on the target operating line of the gas turbine engine compressor such that the current operating point of the gas turbine engine compressor is moved nearer towards or onto the target operating line of the gas turbine engine compressor;
wherein, at idle conditions, the gas turbine engine compressor is simultaneously operating at the minimum required outlet pressure of the gas turbine engine compressor and at the minimum required rotational speed of the compressor rotor,
wherein the target operating line corresponds to a ratio between the rotational speed and the outlet pressure of the gas turbine engine compressor, the target operating line including a point comprising the minimum required rotational speed and a minimum required outlet pressure.

14. A method as claimed in claim 13 comprising:
measuring the temperature at the inlet of the gas turbine engine,
measuring a rotational speed of a fan rotor, and
multiplying the temperature at the inlet of the gas turbine engine by a function of a corrected non-dimensional speed of rotation of the fan rotor to determine the inlet temperature of the gas turbine engine compressor.

15. A method as claimed in claim 14 comprising determining the corrected non-dimensional speed of rotation of the fan rotor by dividing the rotational speed of the fan rotor by the square root of (the temperature at the inlet of the gas turbine engine divided by sea level ISA temperature).

16. A method as claimed in claim 13 comprising:
determining a corrected outlet pressure of the gas turbine engine compressor by dividing the outlet pressure by (the pressure at the inlet of the gas turbine engine divided by sea level ISA pressure).

17. A method as claimed in claim 16 comprising determining a corrected non-dimensional speed of the compressor rotor by dividing the rotational speed of the compressor rotor by (the square root of the inlet temperature of the gas turbine engine divided by sea level ISA temperature).

18. A method as claimed in claim 17 comprising selecting the angle of the stator vanes of the at least one stage of variable stator vanes as a function of the rotational speed of the gas turbine engine compressor rotor divided by (the square root of the inlet temperature of the gas turbine engine divided by sea level ISA temperature).

19. A method as claimed in claim 13 comprising adjusting the angle of the at least one stage of variable stator vanes in order to increase a corrected outlet pressure of the gas turbine engine compressor at a rotational speed of the compressor rotor or adjusting the at least one stage of variable stator vanes in order to decrease the corrected outlet pressure of the gas turbine engine compressor at a rotational speed of the compressor rotor.

20. A method as claimed in claim 13 wherein the at least one stage of variable stator vanes comprises a plurality of circumferentially arranged and radially extending variable stator vanes.

21. A method as claimed in claim 20 wherein the at least one stage of variable stator vanes comprises a plurality of stages of variable stator vanes.

22. A method as claimed in claim 13 comprising arranging the target operating line to pass through a point where a line of minimum required outlet pressure of the gas turbine engine compressor and a line of minimum required rotational speed of the compressor rotor intersect.

23. A method as claimed in claim 13 comprising:
arranging the compressor rotor to drive an electrical generator, and
arranging the gas turbine engine compressor to pressurise an air system,
wherein the minimum required rotational speed of the compressor rotor is a minimum electrical generator speed, and the minimum outlet pressure is an outlet pressure required to maintain adequate air system pressure ratios.

24. A gas turbine engine compressor variable stator vane arrangement comprising:
a gas turbine engine including:
a gas turbine engine compressor,
a compressor rotor,
a compressor casing, and
at least one stage of variable stator vanes, the at least one stage of variable stator vanes being pivotally mounted in the compressor casing,
an actuating arrangement arranged to rotate stator vanes of the at least one stage of variable stator vanes,
a control arrangement comprising a speed sensor arranged to measure a rotational speed of the compressor rotor,
a pressure sensor to measure an outlet pressure of the gas turbine engine compressor,
a processor configured to determine a current operating point of the gas turbine engine compressor from a measured rotational speed of the compressor rotor and the outlet pressure of the gas turbine engine compressor,
the processor is arranged to select a point of intersection of the minimum required outlet pressure of the gas turbine engine compressor and the minimum required rotational speed of the compressor rotor as a point on a target operating line of the gas turbine engine compressor,
a comparator is arranged to compare the current operating point of the gas turbine engine compressor with the target operating line of the gas turbine engine compressor,
the processor is arranged to adjust an angle of the at least one stage of variable stator vanes if the comparator determines that the current operating point of the gas turbine engine compressor is not on the target operating line of the gas turbine engine compressor such that the current operating point of the gas turbine engine compressor is moved nearer towards or onto the target operating line of the gas turbine engine compressor, and
such that at idle conditions the gas turbine engine compressor is simultaneously operating at the minimum required outlet pressure of the gas turbine engine compressor and at the minimum required rotational speed of the compressor rotor,
wherein the target operating line corresponds to a ratio between the rotational speed and the outlet pressure of the gas turbine engine compressor, the target operating line including a point comprising the minimum required rotational speed and a minimum required outlet pressure.

25. A method of operating a gas turbine engine compressor variable stator vane arrangement, the gas turbine engine compressor variable stator vane arrangement comprising a gas turbine engine including 1) a gas turbine engine compressor, 2) a compressor rotor, 3) a compressor casing, and 4) at least one stage of variable stator vanes, the at least one stage of variable stator vanes being pivotally mounted in the compressor casing, and an actuating arrangement arranged to rotate stator vanes of the at least one stage of variable stator vanes, the method comprising:
measuring a rotational speed of the compressor rotor,
measuring an outlet pressure of the gas turbine engine compressor,
determining a current operating point of the gas turbine engine compressor from the rotational speed of the compressor rotor and the outlet pressure of the gas turbine engine compressor,
selecting a point of intersection of the minimum required outlet pressure of the gas turbine engine compressor and the minimum required rotational speed of the compressor rotor as a point on a target operating line of the gas turbine engine compressor,
comparing the current operating point of the gas turbine engine compressor with the target operating line of the gas turbine engine compressor,
adjusting an angle of the at least one stage of variable stator vanes if the comparator determines that the current operating point of the gas turbine engine compressor is not on the target operating line of the gas turbine engine compressor such that the current operating point of the gas turbine engine compressor is moved nearer towards or onto the target operating line of the gas turbine engine compressor, and
such that at idle conditions the gas turbine engine compressor is simultaneously operating at the minimum required outlet pressure of the compressor and at the minimum required rotational speed of the compressor rotor,
wherein the target operating line corresponds to a ratio between the rotational speed and the outlet pressure of the gas turbine engine compressor, the target operating line including a point comprising the minimum required rotational speed and a minimum required outlet pressure.

26. A gas turbine engine compressor variable stator vane arrangement comprising:
a gas turbine engine compressor including:
a compressor rotor,
a compressor casing, and
at least one stage of variable stator vanes, the at least one stage of variable stator vanes being pivotally mounted in the compressor casing,
the compressor rotor is arranged to drive an electrical generator,
the gas turbine engine compressor is arranged to pressurise an air system,
an actuating arrangement arranged to rotate stator vanes of the at least one stage of variable stator vanes,
a control arrangement comprising a speed sensor arranged to measure a rotational speed of the compressor rotor,
a pressure sensor to measure an outlet pressure of the compressor,
a processor arranged to determine a current operating point of the gas turbine engine compressor from the rotational speed of the compressor rotor and the outlet pressure of the gas turbine engine compressor,
the processor is arranged to determine a minimum required rotational speed of the compressor rotor and a minimum required outlet pressure of the gas turbine engine compressor,
wherein the minimum required rotational speed of the compressor rotor is a minimum electrical generator speed and the minimum outlet pressure is an outlet pressure required to maintain adequate air system pressure ratios, the processor is arranged to select a point of intersection of the minimum required outlet pressure of the gas turbine engine compressor and the minimum required rotational speed of the compressor rotor as a point on a target operating line of the gas turbine engine compressor, a comparator is arranged to compare the current operating point of the gas turbine engine compressor with the target operating line of the gas turbine engine compressor, the processor is arranged to adjust an angle of the variable stator vanes if the comparator determines that the current operating point of the compressor is not on the target operating line of the gas turbine engine compressor such that the current operating point of the gas turbine engine compressor is moved nearer towards or onto the target operating line of the gas turbine engine compressor and such that at idle conditions the gas turbine engine compressor is simultaneously operating at the minimum required outlet pressure of the compressor and at the minimum required rotational speed of the compressor rotor, wherein the target operating line corresponds to a ratio between the rotational speed and the outlet pressure of the gas turbine engine compressor, the target operating line including a point comprising the minimum required rotational speed and a minimum required outlet pressure.

27. A method of operating a gas turbine engine compressor variable stator vane arrangement, the compressor comprising a gas turbine engine compressor including 1) a compressor rotor, 2) a compressor casing, and 3) at least one stage of variable stator vanes, the at least one stage of variable stator vanes being pivotally mounted in the compressor casing, the compressor rotor is arranged to drive an electrical generator, the gas turbine engine compressor is arranged to pressurise an air system, and an actuating arrangement arranged to rotate stator vanes of the at least one stage of variable stator vanes, the method comprising:

measuring a rotational speed of the compressor rotor, measuring an outlet pressure of the gas turbine engine compressor, determining a current operating point of the gas turbine engine compressor from the rotational speed of the gas turbine engine compressor and the outlet pressure of the gas turbine engine compressor, determining a minimum required rotational speed of the compressor rotor and a minimum required outlet pressure of the gas turbine engine compressor, wherein the minimum required rotational speed of the compressor rotor is a minimum electrical generator speed and the minimum outlet pressure is an outlet pressure required to maintain adequate air system pressure ratios, selecting a point of intersection of the minimum required outlet pressure of the gas turbine engine compressor and the minimum required rotational speed of the compressor rotor as a point on a target operating line of the gas turbine engine compressor, comparing the current operating point of the gas turbine engine compressor with the target operating line of the gas turbine engine compressor, adjusting an angle of the at least one stage of variable stator vanes if the comparator determines that the current operating point of the gas turbine engine compressor is not on the target operating line of the gas turbine engine compressor such that the current operating point of the gas turbine engine compressor is moved nearer towards or onto the target operating line of the gas turbine engine compressor, and such that at idle conditions the gas turbine engine compressor is simultaneously operating at the minimum required outlet pressure of the gas turbine engine compressor and at the minimum required rotational speed of the compressor rotor, wherein the target operating line corresponds to a ratio between the rotational speed and the outlet pressure of the gas turbine engine compressor, the target operating line including a point comprising the minimum required rotational speed and a minimum required outlet pressure.

* * * * *